Nov. 4, 1941.  H. S. JANDUS  2,261,377
AUTOMOBILE BUMPER STRUCTURE
Filed Aug. 16, 1940
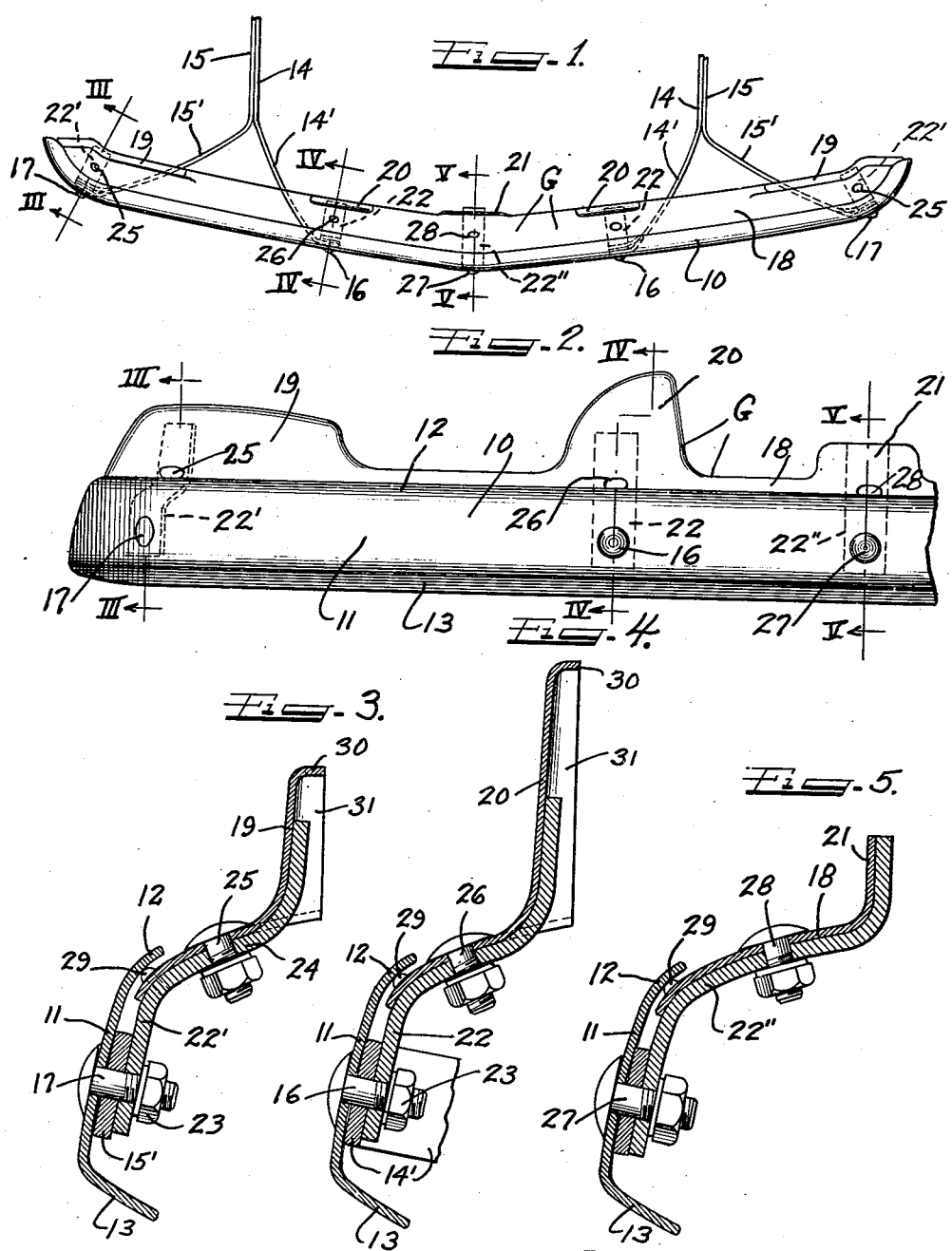
Inventor
HERBERT S. JANDUS.

Patented Nov. 4, 1941

2,261,377

UNITED STATES PATENT OFFICE 2,261,377

AUTOMOBILE BUMPER STRUCTURE

Herbert S. Jandus, Detroit, Mich., assignor to Houdaille-Hershey Corporation, Detroit, Mich., a corporation of Michigan Application August 16, 1940, Serial No. 352,837

5 Claims. (Cl. 293—55)

My invention relates to automobile bumper structure in which a main impact bar portion is provided extending transversely of the vehicle, and additional bumper guard portions extending upwardly beyond the top of the impact bar portion. Bumper structures have been developed in which the guard portions are integral with the main impact bar and extend upwardly therefrom at desired locations, usually at the ends of the impact bar to serve as fender shields, and at points intermediate the ends for protecting the radiator or grillwork and for guarding against bumper interlock.

The main object of my invention is to provide a bumper structure in which the main impact bar portion is the conventional spring steel bar connected by hangers to the automobile chassis in the usual way, and in which bumper structure the upwardly extending bumper guard portions form part of a separate or secondary structure attached independently to the hangers behind the main impact or face bar. This additional or secondary guard structure may extend entirely across the vehicle behind the main impact or face bar and can be formed integrally of sufficiently heavy sheet metal and shaped to provide guard portions for fender and lamp protection and for radiator and grille protection and which secondary structure may also efficiently function for gravel deflection. This secondary structure may be made of mild steel which can readily be formed cold. This separate guard structure may be an accessory which may be readily applied to vehicles behind the conventional main impact bar of the bumper.

My invention is clearly disclosed on the drawing in which:

Figure 1 is a plan view of the bumper structure and the supporting bars or hangers;

Figure 2 is an enlarged front elevation of one-half of the bumper structure;

Figure 3 is an enlarged section on plane III—III of Figures 1 and 2;

Figure 4 is an enlarged section on plane IV—IV of Figures 1 and 2; and

Figure 5 is an enlarged section on plane V—V of Figures 1 and 2.

The main impact bar 10 of the bumper structure is, as shown, of the conventional type extending across one end of the vehicle and of desirable convex curvature. The convex form of the bar shown is such that the bar will present a substantially flat body portion 11 with the upper longitudinally extending portion 12 gradually curved rearwardly, and the lower longitudinal portion 13 deflected rearwardly at an angle with the body portion.

A hanger assembly is provided for each end of the impact bar for supporting it from the vehicle chassis. Each hanger assembly comprises an inner bar 14 and an outer bar 15, the bars along their rear ends being straight and abutting and adapted for securing to the vehicle chassis in any well known manner. Each inner bar 14 has its outer portion 14' deflected laterally inwardly for seating of its end against the inner side of the impact bar to be secured thereto as by a bolt 16 as shown on Figure 4. Each outer bar has its outer portion 15' deflected laterally outwardly for engagement at its end against the back of the impact bar to be secured thereto as by a bolt 17 as shown on Figure 3, the bolts extending through the body portion 11 of the impact bar at substantially the longitudinal median line thereof.

The secondary or guard structure G is behind and extends upwardly beyond the top of the impact bar 10. This secondary structure may be an integral structure which may be readily formed cold of mild steel. The structure G has the body or base part 18 which is inclined transversely, and at desired points thereof portions are extended upwardly to provide shield or guard walls. As shown, at each end of the structure G the seating wall 18 is continued upwardly to provide a fender guard 19, and inwardly of this fender guard portion the wall 18 is continued upwardly to provide a guard portion 20 for protection of the grille or radiator parts of the vehicle, while at the center of the structure G the wall 18 may be continued upwardly to form a center guard 21. For supporting the structure G, bracket members 22 are shown provided, these bracket members being of flat metal bars and of generally ogee shape. The brackets 22 and 22' at each end of the structure G are secured at their lower ends to the impact bar 10 by the bolts 16 and 17 respectively which secure the ends 14' and 15' of the respective hanger bars to the impact bar, the brackets being preferably outside of the hanger bars to be engaged by the nuts 23 of the bolts. The intermediate parts 24 of the brackets form seats intimately engaged by the body portion 18 of the guard structure G and are secured thereto as by bolts 25. The upper ends of each outer brackets 22' extend upwardly behind and to form a support for the respective fender shield or guard portions 19, while the upper ends of each of the brackets 22 extend behind the respective guard portions 20 of the structure G to form a backing therefor.

The middle bracket 22" is secured at its lower end to the main impact bar 10 as by a bolt 27, the bracket being secured at its intermediate or inclined portion to the body 18 of the guard structure as by a bolt 28, and the upper end of the bracket extends behind the center guard portion 21 of the guard structure G to form a backing therefor.

When the guard structure G has been secured in place the lower longitudinal portion of its body 18 will be overlapped by the inclined longitudinal upper portion 12 of the impact bar 10 so that when the bumper structure is viewed from the front, the guard structure will appear to be a continuation of the impact bar. Between the overlapping portions of the impact bar and the guard structure rubber buttons 29 may be inserted which will be slightly compressed when the guard structure is secured to the impact structure and will prevent relative movement which might cause rattling noises.

In order to further strengthen the guard elements 19 and 20, the peripheral top and side portions 30 and 31 respectively thereof may be deflected to form stiffening flanges or ribs. The center guard portion 21 may be similarly deflected, or may remain flat as shown.

The inclined body 18 of the guard structure G extending rearwardly from the top of the impact bar will serve efficiently for the deflection of gravel or stones thrown out by the driving wheels of the vehicle, and the guard or shield portions 19 located behind the fenders and wheels will also assist in deflecting gravel and preventing deflection of gravel against the vehicle body.

It is evident that the guard structure G may be applied to form part of the bumper structure when first applied to the vehicle or that the guard structure may be in the nature of an accessory readily applied to vehicles having only the conventional impact bumper bar thereon.

I have shown a practical and efficient embodiment of my invention but I do not desire to be limited to the exact construction and arrangement shown and described as changes and modifications may be made without departing from the scope of the invention.

I claim as follows:

1. An automobile bumper structure comprising a main bumper impact bar of conventional design for extending across the end of the vehicle, a guard structure formed integrally of sheet metal located behind and extending the full length of the impact bar, the longitudinally extending body portion of said guard structure being transversely inclined rearwardly and then upwardly with its lower portion engaging throughout its length against and to be overlapped by the upper portion of the impact bar whereby said body portion will form a vertical continuation of the impact bar, and means securing said impact bar and guard structure to the vehicle, portions at the upper end of said guard structure body part being continued upwardly to provide guard areas for protecting desired parts of the vehicle.

2. A vehicle bumper structure comprising a main impact bar of substantially uniform height throughout and extending across an end of the vehicle, a one piece continuous sheet metal guard structure extending full length of said impact bar and rearwardly and then upwardly from directly behind the upper part of said impact bar to form a continuation thereof, hanger assemblies for said impact bar, supporting brackets for said guard structure, and securing means for securing said impact bar and said supporting brackets to said hanger assemblies, portions of said guard structure being continued upwardly to provide guard areas for protecting desired parts of the vehicle.

3. A bumper structure comprising a bumper impact bar for extending across the end of a vehicle, a hanger assembly for each end of said impact bar each comprising inner and outer hanger bars, bolts securing said impact bar to the outer ends of said hanger bars, brackets of substantially ogee shape secured at their lower ends by said bolts and extending upwardly with their middle portions inclined rearwardly and upwardly, a guard structure formed independently of said impact bar and seated on said supporting brackets to form a continuation of said impact bar, means securing said guard structure to said brackets, the upper ends of said brackets extending substantially vertically, and portions of said guard structure in front of said brackets being deflected upwardly to provide guard elements.

4. A vehicle bumper structure comprising a main impact bar of substantially the same vertical width throughout, hanger assemblies secured to said impact bar for supporting it from the vehicle, brackets of generally ogee shape secured at their lower ends to said hanger assemblies to extend upward beyond the impact bar, a sheet metal guard structure mounted on said brackets to form a rearward and upward continuation of said impact bar and to function to deflect gravel, portions at the rear end of said guard structure being deflected upwardly to form guards for protecting desired parts of the vehicle.

5. An attachment for a conventional bumper impact bar secured by bolts to hanger assemblies extending from the vehicle, comprising brackets of generally ogee shape secured at their lower ends by said impact bar securing bolts to extend upwardly beyond the impact bar, and an integral guard structure formed of sheet metal and secured on said brackets to form a rearward and upward continuation of said impact bar to serve as a gravel deflector and having vertically extended portions for guarding desired parts of the vehicle.

HERBERT S. JANDUS.